US 8,570,280 B2

(12) United States Patent
Stewart et al.

(10) Patent No.: US 8,570,280 B2
(45) Date of Patent: Oct. 29, 2013

(54) FILTERING OF INADVERTENT CONTACT WITH TOUCH PAD INPUT DEVICE

(75) Inventors: Aaron Michael Stewart, Raleigh, NC (US); Masaki Matsubara, Kanagawa (JP); Hidetoshi Mori, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 854 days.

(21) Appl. No.: 12/410,899

(22) Filed: Mar. 25, 2009

(65) Prior Publication Data
US 2010/0245258 A1    Sep. 30, 2010

(51) Int. Cl.
*G06F 3/041* (2006.01)
(52) U.S. Cl.
USPC ........................... 345/173; 345/211
(58) Field of Classification Search
USPC ........ 345/173–175, 150, 179, 211; 178/20.03
See application file for complete search history.

(56) References Cited

U.S. PATENT DOCUMENTS

| 6,998,545 | B2 * | 2/2006 | Harkcom et al. ........... 178/18.02 |
| 7,103,852 | B2 * | 9/2006 | Kairis, Jr. ....................... 715/800 |
| 2006/0176283 | A1 * | 8/2006 | Suraqui .......................... 345/173 |
| 2006/0238517 | A1 * | 10/2006 | King et al. ..................... 345/173 |
| 2007/0182722 | A1 * | 8/2007 | Hotelling et al. .............. 345/173 |
| 2008/0012837 | A1 * | 1/2008 | Marriott et al. ................ 345/173 |
| 2008/0068350 | A1 * | 3/2008 | Rosenberg et al. ........... 345/173 |

* cited by examiner

*Primary Examiner* — Andrew Sasinowski
(74) *Attorney, Agent, or Firm* — John L. Rogitz; John M. Rogitz

(57) ABSTRACT

An approach is provided that filters out inadvertent contact with a touch pad input device. A filter area is defined within a surface of a touch pad input device that is accessible from an information handling system, such as a computer system. When a user of the information handling system contacts the surface of the touch pad, an input stream is received. The input stream includes an origination point where contact was initially made by the user. If the origination point is within the defined filter area, then the input stream is filtered out (not processed). On the other hand, if the origination point is outside of the defined filter area, then the input stream is processed by the information handling system.

20 Claims, 8 Drawing Sheets

FILTERING OF INADVERTENT CONTACT WITH TOUCH PAD INPUT DEVICE

BACKGROUND OF THE INVENTION

1. Technical Field

The present invention relates to filtering inadvertent contact with a touch pad device. More particularly, the present invention relates to filtering contact with a touch pad device when the origination point of contact falls within a defined filter area.

2. Description of the Related Art

Touch pad input devices translate the motion and position of a user's fingers to a relative position on a display screen. Touch pads are commonly integrated in smaller information handling systems, such as laptop computer systems, personal digital assistants (PDAs), some portable media players, and some mobile telephone devices. Touch pads can be used instead of traditional mouse input devices and are preferred in some environments where space is limited, such as when working in confined spaces like that found on commercial airlines.

When integrated in an information handling system, such as in the palm rest area of a laptop computer system, the surface of the touch pad can sometimes be inadvertently touched by the user, such as when the user is typing on the keyboard but a part of the user's hand brushes against the surface of the touch pad. This inadvertent touching causes the cursor, or input location, to move. Inadvertent touching can be frustrating to the user as the input location within a document being typed by the user shifts when the inadvertent touching occurs causing the user's typing to appear in another area of the document rather than where the user intended. Exacerbating this challenge is the trend to have integrated touch pad surfaces be flush with the surrounding surface (e.g., having the touch pad surface be flush with the surface of a palm rest surface in a laptop computer system). These flush mounted track pads increase the chances of inadvertent touching of the track pad surface by the user.

SUMMARY

An approach is provided that filters out inadvertent contact with a touch pad input device. A filter area is defined within a surface of a touch pad input device that is accessible from an information handling system, such as a computer system. When a user of the information handling system contacts the surface of the touch pad, an input stream is received. The input stream includes an origination point where contact was initially made by the user. If the origination point is within the defined filter area, then the input stream is filtered out (not processed). On the other hand, if the origination point is outside of the defined filter area, then the input stream is processed by the information handling system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention.

Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
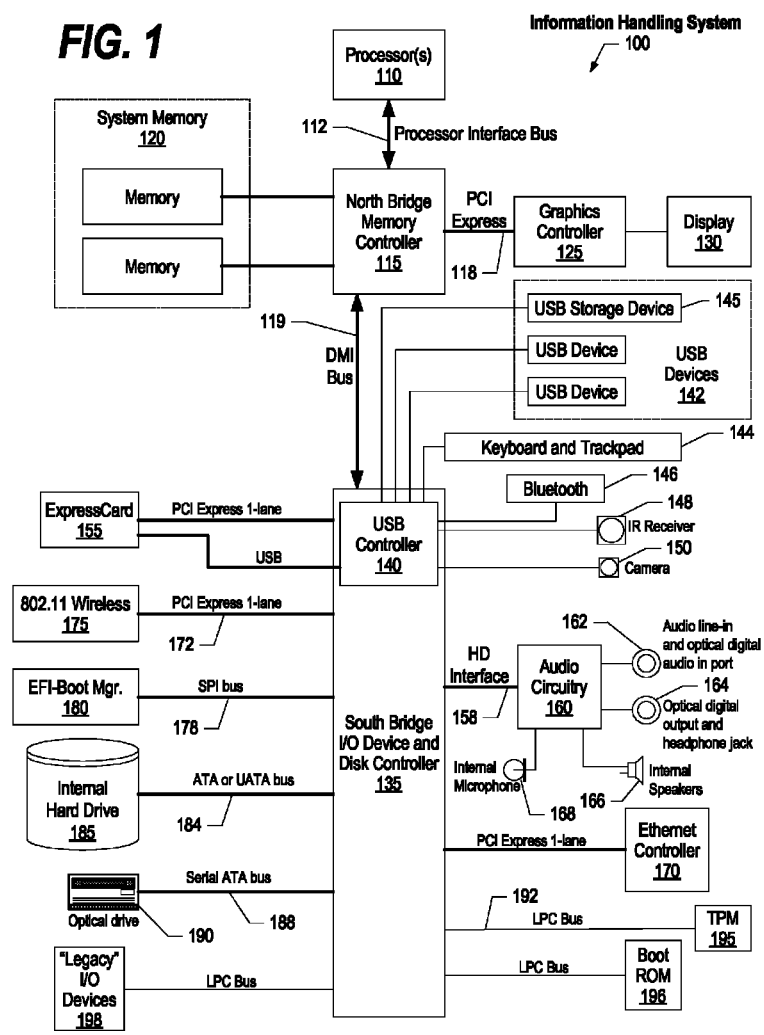
FIG. 1 is a block diagram of a data processing system in which the methods described herein can be implemented.
Figure 2:
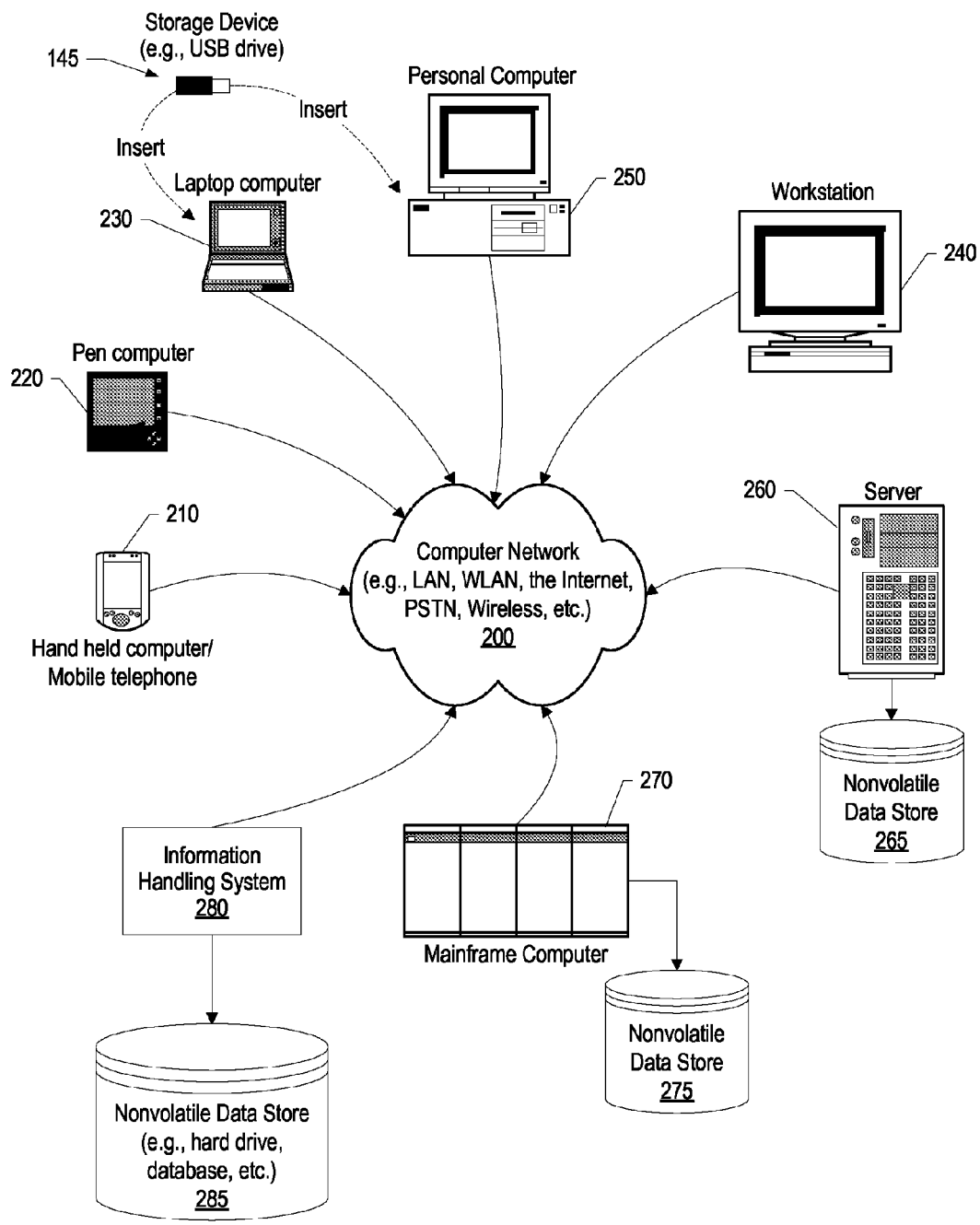
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
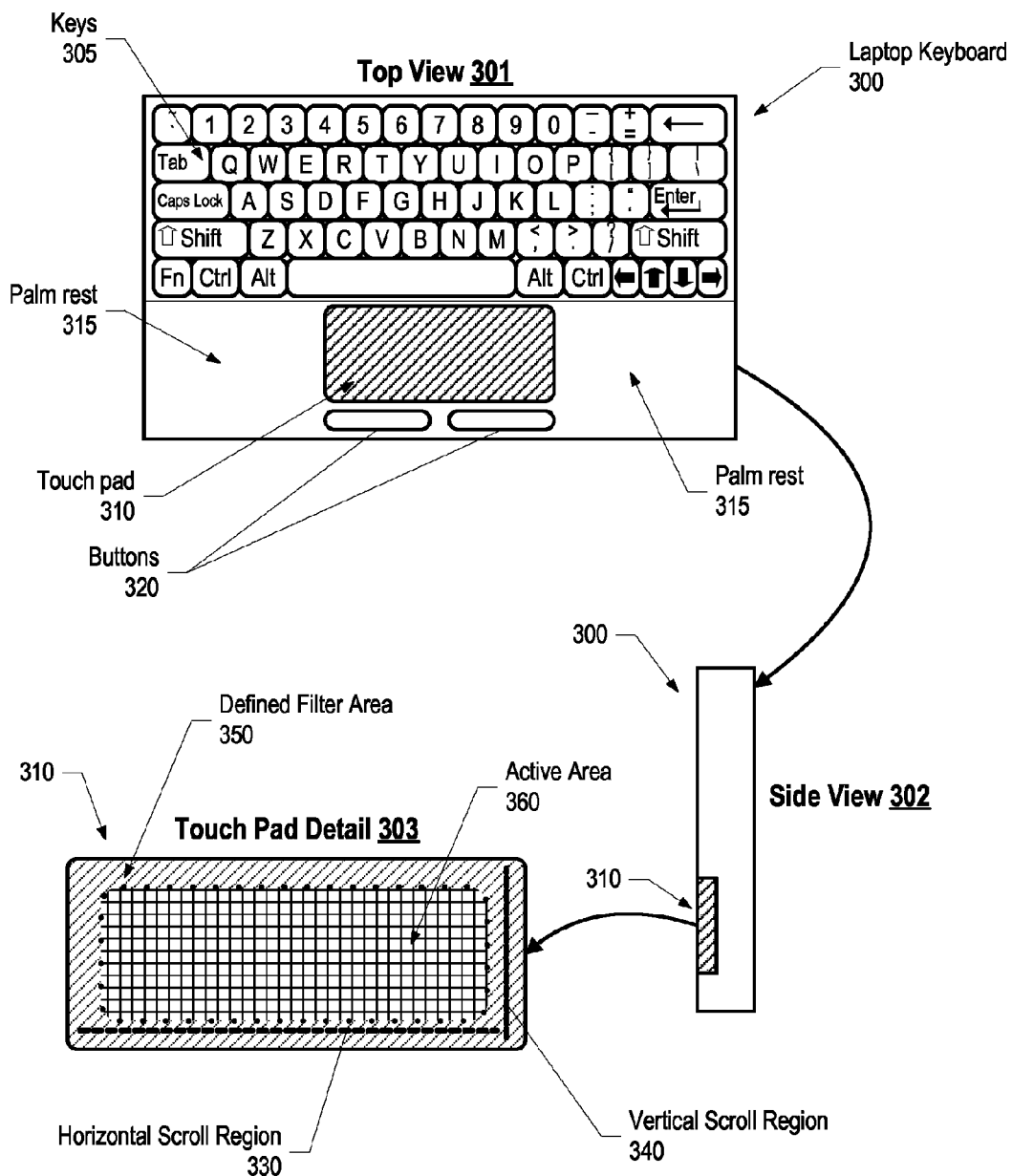
FIG. 3 is a diagram of an integrated touch pad input device with a surface that is flush with the surrounding palm rest area.

FIG. 3 is a diagram of a touch pad input device with a surface that is flush with the surrounding palm rest area. Top view 301 shows laptop keyboard 300 with keys 305, palm rest 315, and touch pad 310 integrated in palm rest area 315. Buttons 320 are used with touch pad 320 (e.g., used to left and right "click" on items selected using touch pad 310).

Side view 302 shows a side cross-sectional view of laptop keyboard 300, including cross-section of touch pad 310. In one embodiment, as shown, the surface of touch pad 310 is flush with the surface of palm rest 315. In other embodiments, the surface of the touch pad is lower than the surface of the palm rest.

Touch pad detail 303 shows touch pad 310 with horizontal scroll region 330 and vertical scroll region 340. As the name implies, horizontal scroll region 330 is used to scroll contents of the display left and right by placing a finger on the touch pad surface in the horizontal scroll region and moving the finger left and right. Likewise, vertical scroll region 340 is used by the user to scroll contents up and down by moving the user's finger up and down in vertical scroll region 340. Defined filter area 350 is the area that is filtered when origination input is detected in this area. In other words, if the user's initial contact point (the origination point) is in the defined filter area, then the input is filtered (disregarded). As shown, in one embodiment, defined filter area 350 is along the edges of the surface of touch pad 310 because inadvertent contact with the touch pad surface generally occurs along the edges. However, in other environments, the filter area may be defined as any region of the touch pad surface that should be ignored (filtered). In an embodiment employing both scroll regions and defined filter areas, as shown, the filter process detects whether the edge-detected input is directional, as per the scroll regions. If the input is directional, then scroll actions (horizontal/vertical scrolling) is performed. However, if the edge-input that originates within defined filter area 350 is not directional, then the input is filtered as being inadvertent (e.g., part of the user's hand or finger touches the touch pad surface without intending to select an object or otherwise use the touch pad).

Figure 4:
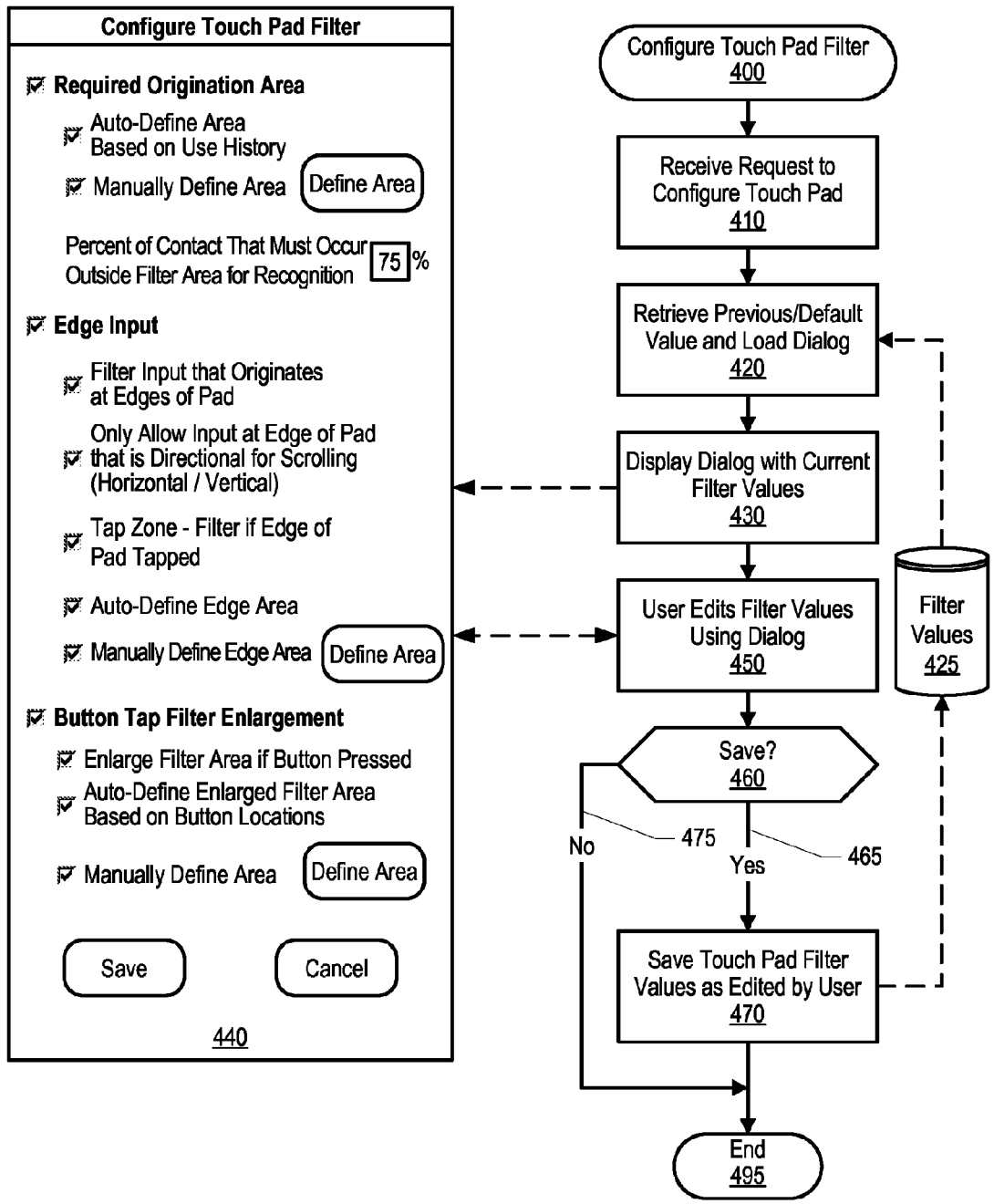
FIG. 4 is a flowchart showing the steps taken during setup of a touch pad configuration by a user.

FIG. 4 is a flowchart showing the steps taken during setup of a touch pad configuration by a user. Processing commences at 400 whereupon, at step 410, the system receives a request (e.g., from the user) to configure touch pad filtering. At step 420, previously set (or default) filter values are loaded from filter values data store 425 and touch pad filter dialog 440 is loaded with the current values. At step 430, dialog 440 is displayed to the user with the current values loaded. At step 450, the user uses dialog 440 to change the touch pad filter values.

Various options are shown in dialog 440. The first set of options are filter values regarding a required origination area. The origination area can be automatically defined based on the user's history of using the touch pad by selecting the Auto-Define Area Based on Use History checkbox. Conversely, the user can manually define the origination area by selecting the "Manually Define Area" checkbox and selecting the corresponding "Define Area" command button. The amount of contact that must occur outside the filter area for recognition is specified in the example as being 75% and this value can be changed by the user. A number of pixels are activated when the user touches the touch pad. If some of the activated pixels are within the filter area and others are outside the filter area, this percentage indicates the percentage of the activated pixels that need to be outside the filter area in order for the input to be recognized. Using the sample 75% value in an example, if 100 pixels are activated and 70 of those pixels lie outside the filter area and 30 of those pixels lie inside the filter area, then the input would be filtered because only 70% of the input and not the required 75% were outside the filter area. Conversely, if 80 of the activated pixels were outside the filter area and 20 of the activated pixels were inside the filter area, then the input would not be filtered because 80% of the contact occurred outside of the filter area which is greater than the 75% required.

Edge input filtering is the next section. The user can select to filter input that originates at the "edge" of the touch pad by selecting the "Filter Input that Originates at Edges of Pad" checkbox. The next checkbox, "Only Allow Input at Edge of Pad that is Directional for Scrolling (Horizontal/Vertical)" is used to allow directional input along edges of the touch pad but non-directional input would still be filtered. This would allow the user to continue using directional scrolling functions on the touch pad. Some users employ "touch zones" that allow actions, such as the launching of an application, when a particular area, or zone, of the touch pad is tapped. When the "Tap Zone—Filter if Edge of Pad Tapped" checkbox is selected, taps that occur along an edge of the touch pad are filtered rather than performing the tap function. Similar to the Origination Area filters described above, the user can have the edge area automatically defined (e.g., based on the layout of the touch pad in relation to buttons, based on user history, etc.) by selecting the "Auto-Define Edge Area" checkbox or the user can manually select the edge filter zones by selecting the "Manually Define Edge Area" checkbox and use the corresponding "Define Area" command button to manually define the user's preferred edge filter area.

As the name implies, the Button Tap Filter Enlargement section provides for a larger filter area when a button is being pressed. Automatic enlargement of filter areas is performed when a button is pressed and the Enlarge Filter Area if Button Pressed" checkbox is selected. Again, the user can have the enlargement automatically defined by selecting the "Auto-Define Enlarged Filter Area Based on Button Locations" checkbox or can manually define the area by selecting the "Manually Define Area" checkbox and press the Define Area command button to manually define the area. As indicated, the actual location of buttons proximate to the touch pad can be utilized automatically. For example, if the left touch pad button is being pressed, then the defined filter area near the left touch pad button may be enlarged so that if the user's finger that is touching the left touch pad button also happens to touch the surface of the touch pad, then this input can be filtered out. When the user is finished using dialog 440, he or she either selects the "Save" button to save any changes or the "Cancel" button to cancel any filter value changes that were made.

A determination is made as to whether the user requested to save the changes made using dialog 440 (decision 460). If the user requested to save the changes, then decision 460 branches to "yes" branch 465 whereupon, at step 470, the touch pad filter values edited by the user in dialog 440 are saved to filter values data store 425. On the other hand, if the user requested to cancel the changes, then decision 460 branches to "no" branch 475 bypassing step 470. Processing used to configure the touch pad filter thereafter ends at 495.

Figure 5:
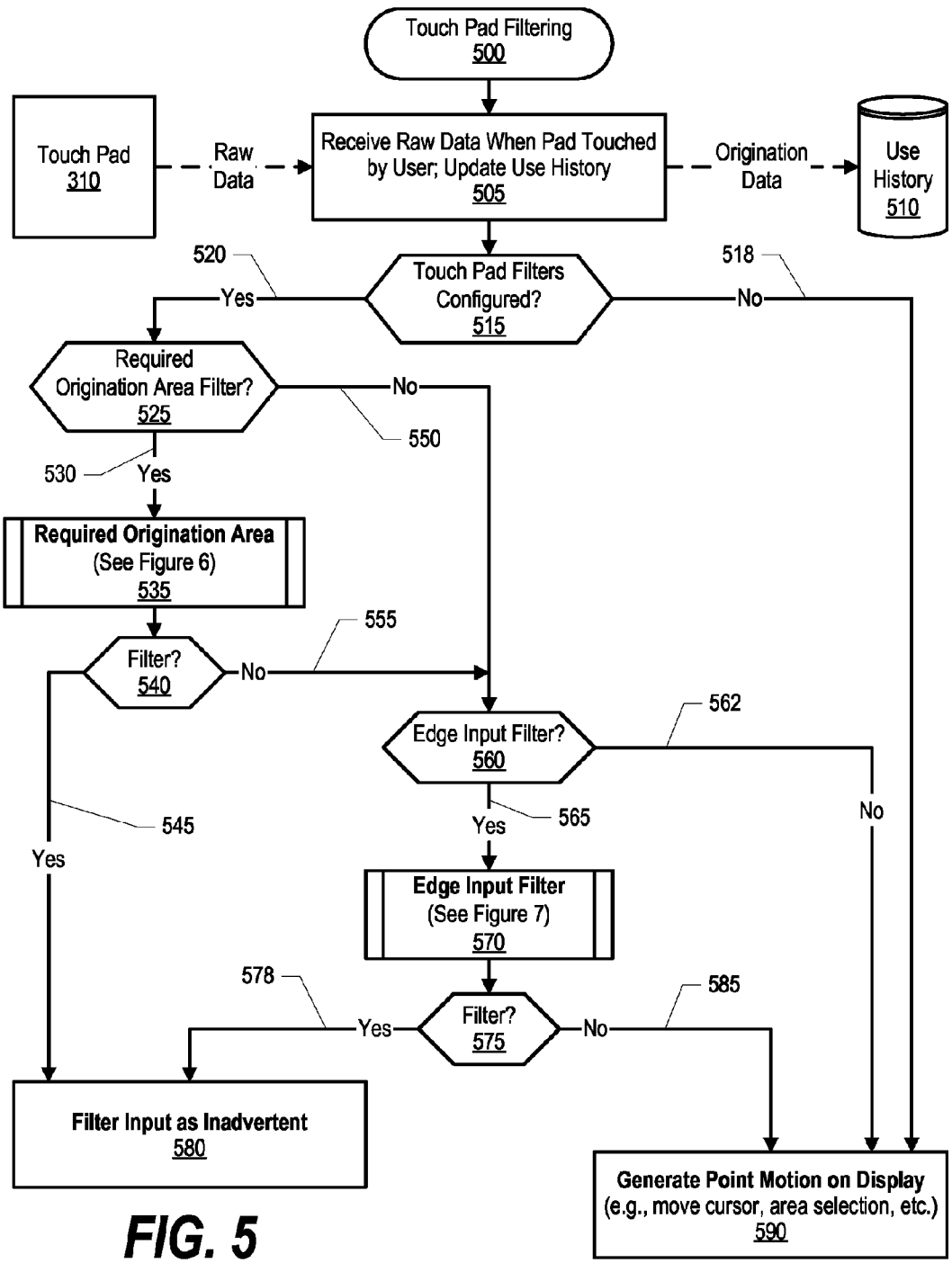
FIG. 5 is a high level flowchart showing steps taken to filter out inadvertent contact with a touch pad surface.

FIG. 5 is a high level flowchart showing steps taken to filter out inadvertent contact with a touch pad surface. Touch pad filter processing commences at 500 whereupon, at step 505, raw data is received when touch pad 310 is touched (contacted) by a user of the information handling system. In addition, use history data is updated and stored in use history data store 510. Use history is used to keep track of where the user historically makes initial contact (origination points) with the touch pad surface.

A determination is made as to whether the user has configured use of the touch pad filters shown in FIG. 4, dialog 440 (decision 515). If the user has not configured, or activated, any touch pad filters, then decision 515 branches to "no" branch 518 bypassing all filtering steps whereupon, at step 590, the appropriate point motion is generated on the display that corresponds to the raw input data received from the touch pad. On the other hand, if touch pad filters have been configured and activated, then decision 515 branches to "yes" branch 520 whereupon a determination is made as to whether the Required Origination Area filter has been configured and activated (decision 525). If the Required Origination Area filter has been configured and activated, then decision 525 branches to "yes" branch 530 whereupon predefined process 535 is performed to determine if the contact origination area falls inside or outside of the defined filter area (see FIG. 6 and corresponding text for processing details). A determination is made as to whether, based on the Required Origination Area processing, the input received at touch pad 310 should be filtered (decision 540). If the input should be filtered, then decision 540 branches to "yes" branch 545 whereupon, at step 580, the input received at the touch pad is filtered out as inadvertent and is not processed. On the other hand, if input is not being filtered by the Required Origination Area predefined process, then decision 540 branches to "no" branch 555 for further processing. Returning to decision 525, if the Required Origination Area filter has not been activated, then decision 525 branches to "no" branch 550 bypassing predefined process 535.

A determination is made as to whether the user has configured use of the edge input filters shown in FIG. 4, dialog 440 (decision 560). If edge input filters have not been activated, then decision 560 branches to "no" branch 562 whereupon, at step 590, the appropriate point motion is generated on the display that corresponds to the raw input data received from the touch pad. On the other hand, if edge input filters have been activated, then decision 560 branches to "yes" branch 565 whereupon predefined process 570 operates in order to determine if the contact should be filtered as falling within an edge filter (see FIG. 7 and corresponding text for processing details). After the edge input filter predefined process has executed, a determination is made as to whether the input received at touch pad 310 should be filtered (decision 575). If the input should be filtered, then decision 575 branches to "yes" branch 578 whereupon, at step 580, the input received is filtered out as inadvertent and is not processed. On the other hand, if the input should not be filtered, then decision 575 branches to "no" branch 585 whereupon, at step 590, the appropriate point motion is generated on the display that corresponds to the raw input data received from the touch pad.

Figure 6:
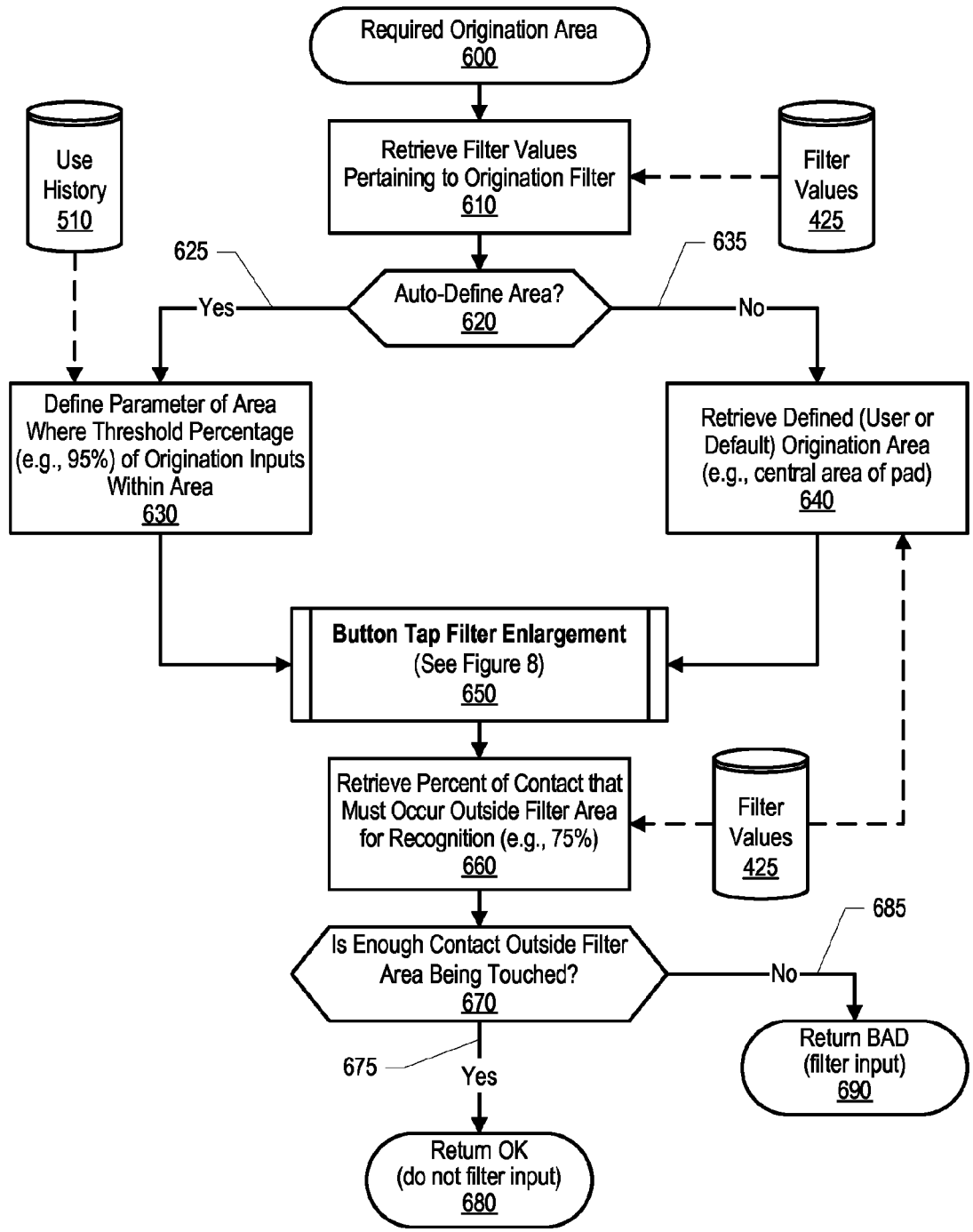
FIG. 6 is a flowchart showing steps taken to filter out input when a required origination area has been configured.

FIG. 6 is a flowchart showing steps taken to filter out input when a required origination area has been configured. The Required Origination Area filtering process commences at 600 whereupon, at step 610, filter values that pertain to the origination filter are retrieved (e.g., from configured filter values 425 or using a predefined (default) value). A determination is made as to whether the user has selected to automatically define the filter area (decision 620). If the user has selected to automatically define the filter area, then decision 620 branches to "yes" branch 625 whereupon, at step 630, the defined filter area is automatically defined using the user's prior use history 510 or using default values. For example, the defined filter area could be defined as those areas on the touch pad where few origination points have occurred or can be defined based upon the known size and shape of the touch pad (e.g., a certain amount around the edges of the touch pad). On the other hand, if a manually defined filter area has been requested by the user, then decision 620 branches to "no" branch 635 whereupon, at step 640, the user's manually defined filter area is retrieved from filter values data store 425.

Button Tap Filter Enlargement (predefined process 650, see FIG. 8 and corresponding text for processing details) is used to see if the defined filter area should be enlarged due to the user pressing a button (e.g., a touch pad selection button). If the defined filter area should be enlarged, predefined process 650 enlarges the defined filter area accordingly. At step 660, the percent of contact that must occur outside of the filter area in order for the input to be recognized is retrieved from filter values data store 425. As described above, an origination point includes a number of pixels that define the area where the user's finger first contacted the surface of the touch pad. If the percent of contact is 75% (as shown in the example), then at least 75% of the user's contact has to occur outside of the filter zone in order to be recognized.

After the defined filter area is determined (including any button tap enlargement), a determination is made as to whether enough user contact is being made outside the defined filter area (decision 670). If enough origination contact was made outside the defined filter area (e.g., 80% of contact outside filter area), then decision 670 branches to "yes" branch 675 whereupon the Required Origination Area processing does not filter the input and processing returns to the calling routine (see FIG. 5) at 680. On the other hand, if not enough origination contact was made outside the defined filter area, then decision 670 branches to "no" branch 685 whereupon the Required Origination processing filters the input (disregards the touch pad input as being inadvertent) and processing returns to the calling routine (see FIG. 5) at 690.

Figure 7:
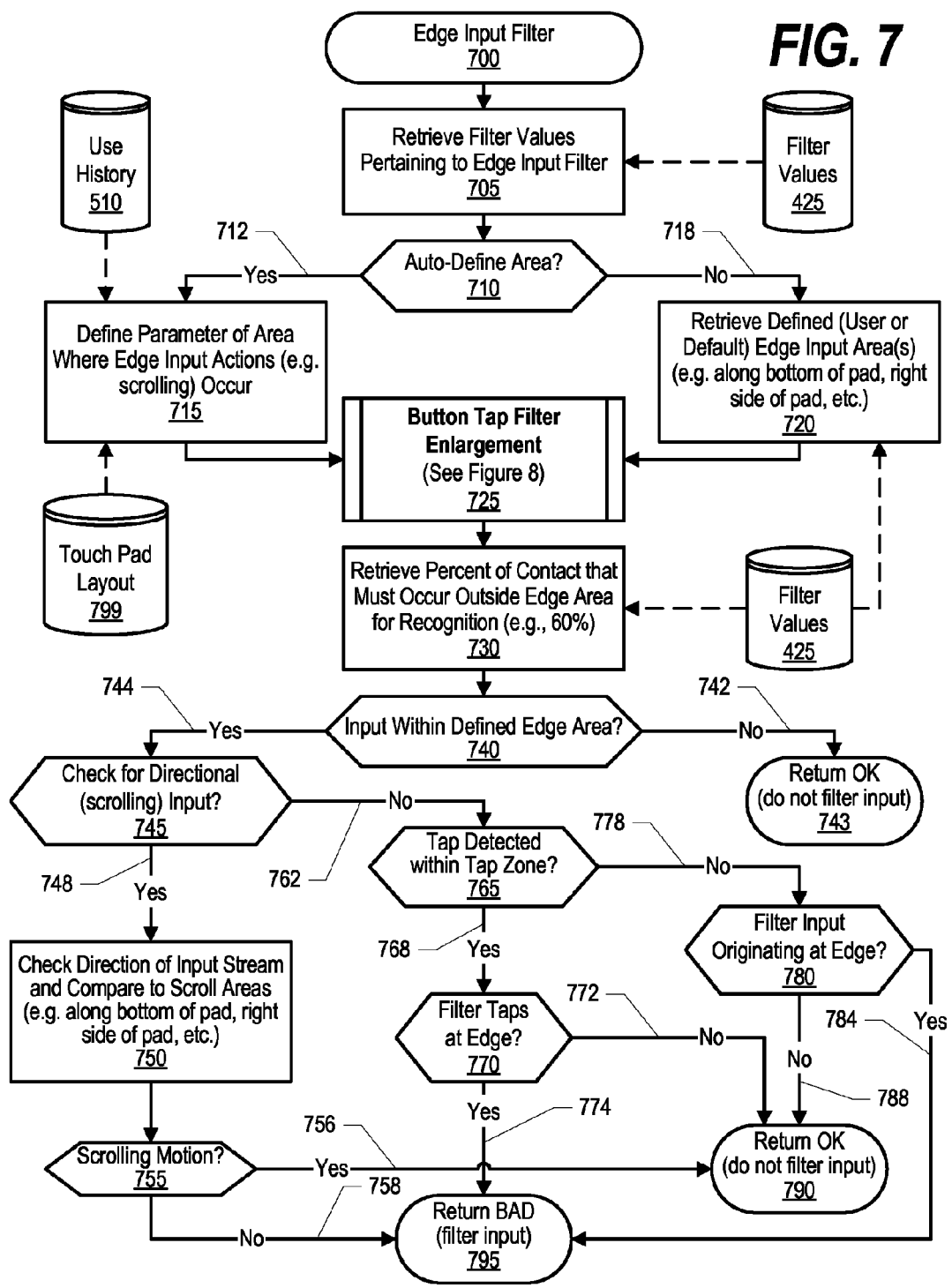
FIG. 7 is a flowchart showing steps taken to filter out input when an edge input filter has been configured.

FIG. 7 is a flowchart showing steps taken to filter out input when an edge input filter has been configured. Edge input filter processing commences at 700 whereupon, at step 705, processing retrieves the filter values that pertain to the edge input filter from filter values data store 425. A determination is made as to whether the user has selected to automatically define the defined filter area (e.g., the edge input filter area) at decision 710. If the user has selected to automatically define the edge filter area, then decision 710 branches to "yes" branch 712 whereupon, at step 715, the defined filter area is automatically defined using the user's prior use history 510, using default values, or using the known touch pad layout. For example, the defined filter area could be defined based upon the known size and shape of the touch pad (e.g., a certain amount around the edges of the touch pad). On the other hand, if a manually defined filter area has been requested by the user, then decision 710 branches to "no" branch 718 whereupon, at step 720, the user's manually defined edge filter area is retrieved from filter values data store 425.

Button Tap Filter Enlargement (predefined process 725, see FIG. 8 and corresponding text for processing details) is used to see if the defined filter area should be enlarged due to the user pressing a button (e.g., a touch pad selection button). If the defined filter area should be enlarged, predefined process 725 enlarges the defined filter area accordingly. At step 730, the percent of contact that must occur outside of the edge filter area in order for the input to be recognized is retrieved from filter values data store 425. As described above, an origination point includes a number of pixels that define the area where the user's finger first contacted the surface of the touch pad. If the percent of contact is 60% (as shown in the example), then at least 60% of the user's contact has to occur outside of the filter zone in order to be recognized.

A determination is made as to whether the input received at the touch pad is within the defined edge area of the touch pad (decision 740). If the input is not within the defined edge area of the touch pad (e.g., is in the center of the pad), then decision 740 branches to "no" branch 742 whereupon processing returns at 743 indicating that the input should not be filtered due to any edge filter values. On the other hand, if the input received at the touch pad is within the defined edge filter area of the touch pad, then decision 740 branches to "yes" branch

744 whereupon a determination is made as to whether the touch pad configuration allows directional input along the edge (e.g., horizontal along a horizontal edge of the touch pad or vertical along a vertical edge of the touch pad) at decision 745.

If the configuration values allow directional input, then decision 745 branches to "yes" branch 748 whereupon, at step 750, the input stream is checked to determine if the user's input is directional (horizontal or vertical) along an edge of the touch pad. A determination is made as to whether the input stream indicates a scrolling motion by the user (decision 755). If the motion is directional (scrolling), then decision 755 branches to "yes" branch 756 whereupon processing returns to the calling routing at 790 indicating that the input should not be filtered due to any edge filter values. On the other hand, if the input within the defined edge filter area, then decision 755 branches to "no" branch 758 whereupon processing returns to the calling routine at 795 indicating that the input should be filtered due to an edge filter value.

Returning to decision 745, if the configuration values do not check for directional input, then decision 745 branches to "no" branch 762 whereupon a determination is made as to whether a tap was detected within a defined tap zone on the touch pad (decision 765). If a tap was detected within a tap zone, then decision 765 branches to "yes" branch 768 whereupon, a determination is made as to whether the configuration values have been set to filter taps that occur in a defined edge filter zone (decision 770). If the filter values have not been configured to filter taps that occur within an edge zone, then decision 770 branches to "no" branch 772 whereupon processing returns to the calling routing at 790 indicating that the input should not be filtered due to any edge filter values. On the other hand, the filter values have been configured to filter out taps that occur within a defined edge area, then decision 770 branches to "yes" branch 774 whereupon processing returns to the calling routine at 795 indicating that the input should be filtered due to an edge filter value.

Returning to decision 765, if a tap was not detected in a defined tap zone, then decision 765 branches to "no" branch 778 whereupon a determination is made as to whether the configuration values have been set to filter out input that originates at the edge of the touch pad (decision 780). If the configuration values have been set to filter out input that occurs within a defined edge filter area, then decision 780 branches to "yes" branch 784 whereupon processing returns to the calling routine at 795 indicating that the input should be filtered due to an edge filter value. On the other hand, if the configuration values have not been set to filter out input that occurs at the edge of the touch pad, then decision 780 branches to "no" branch 788 whereupon processing returns to the calling routing at 790 indicating that the input should not be filtered due to any edge filter values.

Figure 8:
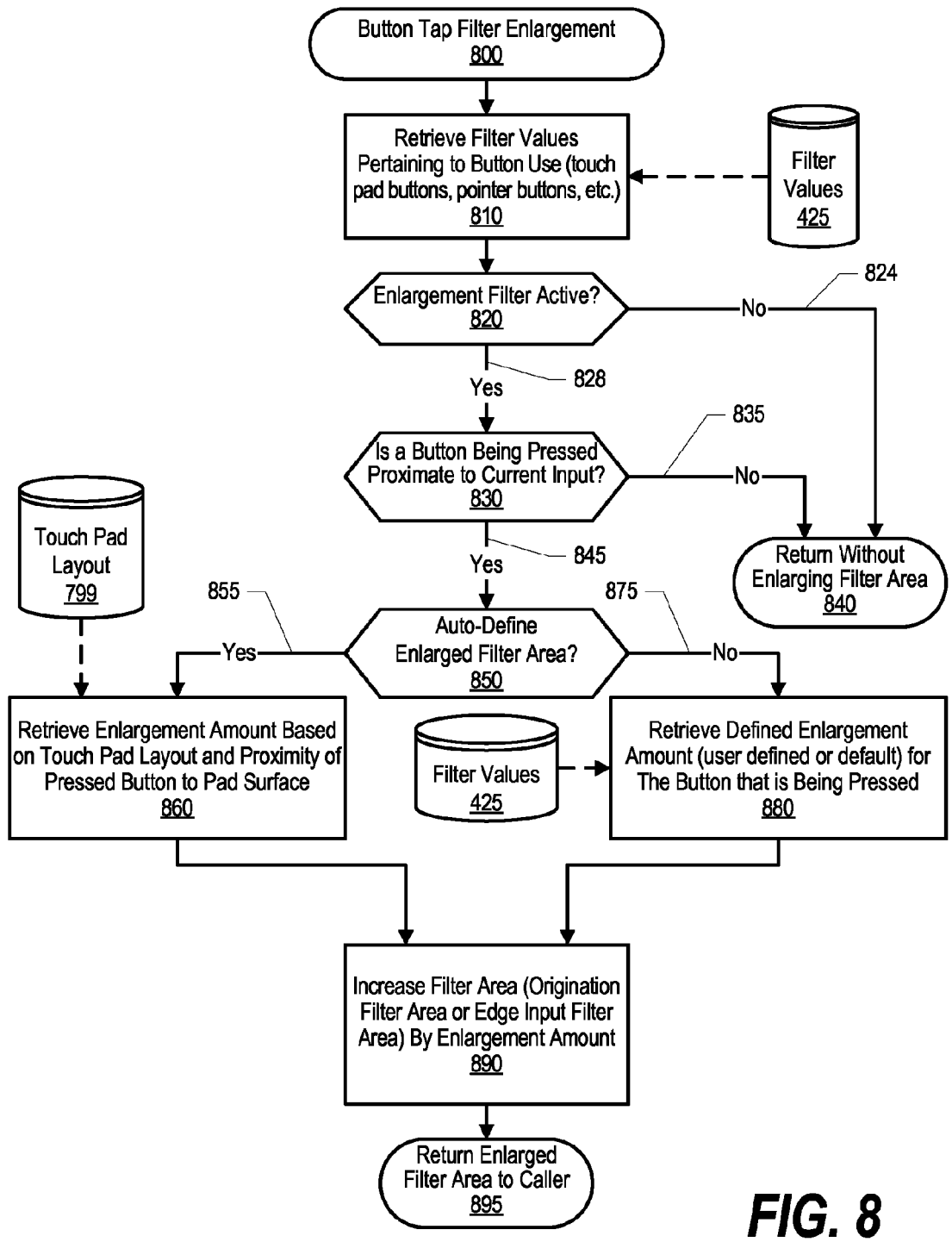
FIG. 8 is a flowchart showing steps taken to dynamically enlarge the filter area when a button is being pressed.

FIG. 8 is a flowchart showing steps taken to dynamically enlarge the filter area when a button is being pressed. Processing commences at 800 whereupon, at step 810, the process retrieves filter values that pertain to button use from filter values 425. Buttons can include touch pad buttons, pointer buttons, keyboard keys, and the like.

A determination is made as to whether the button tap enlargement filter is configured and active (decision 820). If the enlargement filter is not active, then decision 820 branches to "no" branch 824 whereupon processing returns at 840 without enlarging the defined filter area. On the other hand, if the enlargement filter is active, then decision 820 branches to "yes" branch 828 whereupon a determination is made as to whether a button is currently being pressed that is close (proximate) to the current input that is being received at the touch pad (decision 830). If either a button is not being pressed, or a button is being pressed but is not proximate to the current touch pad input, then decision 830 branches to "no" branch 835 whereupon processing returns at 840 without enlarging the defined filter area.

On the other hand, if a button is being pressed that is proximate to the input that is currently being received at the touch pad, then decision 830 branches to "yes" branch 845 whereupon a determination is made as to whether the enlarged defined filter area is defined automatically or manually (decision 850). If the enlarged defined filter area is defined automatically, then decision 850 branches to "yes" branch 855 whereupon, at step 860, the enlargement amount is received from touch pad layout data store 799 that defines the amount of enlargement based upon the actual touch pad layout and the proximity of the pressed button to the touch pad surface. On the other hand, if the enlargement amount is manually defined, then decision 850 branches to "no" branch 875 whereupon, at step 880, the enlargement amount (e.g., a percentage, a predefined shape, etc.) is retrieved from filter values data store 425.

At step 890, the defined filter area, which might be the origination filter area or the edge filter area depending on the routine that is calling FIG. 8, is increased by the retrieved enlargement amount. This enlarged defined filter area is then returned to the calling routine (see FIGS. 6 and 7) at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method executing on an information handling system comprising:
   defining a filter area within a surface of a touch pad input device accessible from the information handling system, the filter area not being solely defined based on the elapse of a period of time a user touches an area to be filtered on the touch pad input device;
   receiving an input stream from the touch pad input device resulting from a user contacting the surface of the touch pad input device, wherein the input stream includes an origination point where contact was initially made by the user, and wherein the origination point includes a plurality of contacted pixels defining a first area;
   retrieving a predetermined contact threshold area from a memory area accessible to the information handling system;
   determining whether the origination point is inside the defined filter area by comparing a portion of the first area that is inside the defined filter area to the predetermined contact threshold area;
   filtering out the input stream in response to a determination that the origination point is within the defined filter area; and
   processing the input stream in response to a determination that the origination point is outside the defined filter area.

2. The method of claim 1 further comprising:
   prior to receiving the input stream:
   receiving at least one filter value from the user of the information handling system, wherein the at least one filter value at least partially defines the predetermined contact threshold area; and
   storing the at least one filter value in the memory area accessible to the information handling system.

3. The method of claim 1 further comprising:
   identifying that a button included in the information handling system is being pressed when the input stream is received; and
   enlarging the defined filter area in response to identifying that the button is being pressed.

4. The method of claim 1 further comprising:
   receiving at least one filter value from the user of the information handling system to at least partially establish the defined filter area; and
   storing the at least one filter value in the memory area accessible to the information handling system.

5. The method of claim 1 further comprising:
   prior to receiving the input stream:
   retrieving a use history that tracks where on the touch pad input device one or more prior origination points have been located; and
   identifying the defined filter area by comparing the retrieved use history to one or more edge areas of the surface of the touch pad input device.

6. The method of claim 1, wherein the filter area includes a first edge of the touch pad, the first edge being the edge of the touch pad nearest to the keyboard of the laptop computer, and wherein a second edge of the touch pad is at least partially outside the filter area, the second edge being optimized for directional scrolling, the touch pad being disposed on a laptop computer.

7. The method of claim 1, wherein the method includes presenting a user interface on a display device prior to receiving the input stream that includes a user-selectable option to at least partially define the predetermined contact threshold area, a user-selectable option to filter input that originates at at least one edge of the touch pad input device, and a user-selectable option to manually define at least one edge included in the filter area of the touch pad input device.

8. The method of claim 1, wherein the input stream is a first input stream, the filter area being defined at least partially based on input history of at least a second input stream that was received prior to receiving the first input stream such that the filter area is defined to be at least one area of the touch pad input device where the at least second input stream was not directed.

9. An information handling system comprising:
   one or more processors;
   a memory coupled to at least one of the processors;
   a nonvolatile storage area coupled to at least one of the processors;
   a touch pad input device accessible to at least one of the processors, the touch pad input device receiving user input at a surface of the touch pad input device; and
   a set of instructions stored in the memory and executable by at least one of the processors in order to perform actions of:
   defining a filter area within the surface of the touch pad input device;
   receiving an input stream from the touch pad input device resulting from a user contacting the surface of the touch pad input device, wherein the input stream includes an origination point where contact was initially made by the user, and wherein the origination point includes a plurality of contacted pixels defining a first area;
   retrieving a predetermined contact threshold area from a memory area accessible to the information handling system;
   determining whether the origination point is inside the defined filter area by comparing a portion of the first area that is inside the defined filter area to the predetermined contact threshold area;
   filtering out the input stream in response to a determination that the origination point is within the defined filter area;
   processing the input stream in response to a determination that the origination point is outside the defined filter area;
   wherein the filter area includes an edge of the touch pad input device used for scrolling and the instructions are executable by the processor to determine whether input received at the edge used for scrolling is for a scroll command, and responsive to determining that the input received at the edge used for scrolling is a scroll command, executing the scroll command, and responsive to determining that the input received at the edge used for scrolling is not a scroll command, filtering the input.

10. The information handling system of claim 9 further comprising additional actions of:
    prior to receiving the input stream:
    receiving at least one filter value from the user of the information handling system, wherein the at least one filter value at least partially defines the predetermined contact threshold area; and
    storing the at least one filter value in the memory area accessible to the information handling system.

11. The information handling system of claim 9 further comprising additional actions of:

receiving at least one value from the user of the information handling system to at least partially establish the defined filter area; and storing the at least one filter value in the memory area accessible to the information handling system.

12. The information handling system of claim 9 further comprising additional actions of:

prior to receiving the input stream:

retrieving a use history that tracks where on the touch pad input device one or more prior origination points have been located; and identifying the defined filter area by comparing the retrieved use history to one or more edge areas of the surface of the touch pad input device.

13. The information handling system of claim 9, wherein the instructions are further executable by the processor to present a user interface on a display of the information handling system including a user-selectable option to at least partially define the predetermined contact threshold area, a user-selectable option to filter input that originates at at least one edge of the touch pad input device, a user-selectable option to only allow input at at least one edge of the touch pad input device if the input is determined to be for scrolling, a user-selectable option to filter taps received at at least one edge of the touch pad input device, and a user-selectable option to manually define at least one edge included in the filter area of the touch pad input device.

14. A computer program product stored in a computer readable storage medium that is not an electromagnetic wave, comprising functional descriptive material that, when executed by an information handling system, causes the information handling system to perform actions comprising:

defining a filter area within a surface of a touch pad input device accessible from the information handling system, the filter area not being solely defined based on the elapse of a period of time a user touches an area to be filtered on the touch pad input device;

receiving an input stream from the touch pad input device resulting from a user contacting the surface of the touch pad input device, wherein the input stream includes an origination point where contact was initially made by the user, and wherein the origination point includes a plurality of contacted pixels defining a first area;

retrieving a predetermined contact threshold area from a memory area accessible to the information handling system;

determining whether the origination point is inside the defined filter area by comparing a portion of the first area that is inside the defined filter area to the predetermined contact threshold area;

filtering out the input stream in response to a determination that the origination point is within the defined filter area; and processing the input stream in response to a determination that the origination point is outside the defined filter area.

15. The computer program product of claim 14 wherein the functional descriptive material, when executed by the information handling system, causes the information handling system to perform further actions comprising:

identifying that a button included in the information handling system is being pressed when the input stream is received; and enlarging the defined filter area in response to identifying that the button is being pressed.

16. The computer program product of claim 14 wherein the functional descriptive material, when executed by the information handling system, causes the information handling system to perform further actions comprising:

identifying that the input stream is an input tap that is within a tap zone defined on the touch pad input device; and performing a predefined tap command corresponding to the tap zone in response to the input stream being outside of the defined filter area.

17. The computer program product of claim 14 wherein the functional descriptive material, when executed by the information handling system, causes the information handling system to perform further actions comprising:

prior to receiving the input stream:

retrieving a use history that tracks where on the touch pad input device one or more prior origination points have been located; and identifying the defined filter area by comparing the retrieved use history to one or more edge areas of the surface of the touch pad input device.

18. The computer program product of claim 14 wherein the functional descriptive material, when executed by the information handling system, causes the information handling system to perform further actions comprising:

prior to receiving the input stream:

receiving at least one filter value from the user of the information handling system, wherein the at least one filter value at least partially defines the predetermined contact threshold area; and storing the at least one filter value in the memory area accessible to the information handling system.

19. The computer program product of claim 14, wherein the filter area includes a first edge of the touch pad, the first edge being the edge of the touch pad nearest to the keyboard of the laptop computer, and wherein a second edge of the touch pad is at least partially outside the filter area, the second edge being optimized for directional scrolling, the touch pad being disposed on a laptop computer.

20. The computer program product of claim 14, wherein the functional descriptive material, when executed by the information handling system, causes the information handling system to perform the additional action of presenting a user interface on a display device prior to receiving the input stream that includes a user-selectable option to at least partially define the predetermined contact threshold area, a user-selectable option to filter input that originates at at least one edge of the touch pad input device, and a user-selectable option to manually define at least one edge included in the filter area of the touch pad input device.

* * * * *